United States Patent
Reiss et al.

[11] Patent Number: 5,885,331
[45] Date of Patent: Mar. 23, 1999

[54] PROCESS FOR THE ADSORPTION OF NITROGEN FROM GAS MIXTURES BY MEANS OF PRESSURE SWING ADSORPTION WITH ZEOLITES

[75] Inventors: Gerhard Reiss, Leverkusen; Lothar Puppe, Burscheid; Bruno Hees, Langenfeld, all of Germany

[73] Assignee: Bayer Aktiengesellschaft, Leverkusen, Germany

[21] Appl. No.: 690,415

[22] Filed: Jul. 25, 1996

[30] Foreign Application Priority Data

Aug. 1, 1995 [DE] Germany .................. 195 28 188.8

[51] Int. Cl.$^6$ ............................................. B01D 53/047
[52] U.S. Cl. .................. 95/96; 95/102; 95/117; 95/130; 95/902
[58] Field of Search ............... 95/96–98, 100–105, 95/117, 130, 902

[56] References Cited

U.S. PATENT DOCUMENTS

| | | | |
|---|---|---|---|
| 3,140,932 | 7/1964 | McKee | 95/130 |
| 3,140,933 | 7/1964 | McKee | 95/130 |
| 3,313,091 | 4/1967 | Berlin | 95/105 |
| 3,773,690 | 11/1973 | Heinze et al. | |
| 4,144,037 | 3/1979 | Armond et al. | 95/95 |
| 4,477,267 | 10/1984 | Reiss | 95/902 X |
| 4,557,736 | 12/1985 | Sircar et al. | 95/130 X |
| 4,684,377 | 8/1987 | Haruna et al. | 95/130 X |
| 4,859,217 | 8/1989 | Chao | 95/130 |
| 4,950,312 | 8/1990 | Puppe et al. | 95/130 |
| 4,971,606 | 11/1990 | Sircar et al. | 95/902 X |
| 5,074,892 | 12/1991 | Leavitt | 95/96 |
| 5,114,440 | 5/1992 | Reiss | 95/96 |
| 5,152,813 | 10/1992 | Coe et al. | 55/26 |
| 5,174,979 | 12/1992 | Chao et al. | 423/715 |
| 5,203,887 | 4/1993 | Toussaint | 95/96 X |
| 5,258,058 | 11/1993 | Coe et al. | 95/130 X |
| 5,266,102 | 11/1993 | Gaffney et al. | 95/5 |
| 5,268,023 | 12/1993 | Kirner | 95/130 X |
| 5,328,503 | 7/1994 | Kumar et al. | 95/130 X |
| 5,411,578 | 5/1995 | Watson et al. | 95/130 X |
| 5,413,625 | 5/1995 | Chao et al. | 95/130 X |
| 5,464,467 | 11/1995 | Fitch et al. | 95/130 X |
| 5,529,610 | 6/1996 | Watson et al. | 95/130 X |

FOREIGN PATENT DOCUMENTS

| | | |
|---|---|---|
| 0128545 | 12/1984 | European Pat. Off. |
| 0170026 | 2/1986 | European Pat. Off. |
| 0297542 | 1/1989 | European Pat. Off. |
| 0546542 | 6/1993 | European Pat. Off. |
| 1203238 | 10/1965 | Germany |
| 60-127202 | 7/1985 | Japan ............ 95/130 |
| 60-231401 | 11/1985 | Japan ............ 95/130 |
| 60-231402 | 11/1985 | Japan ............ 95/130 |

OTHER PUBLICATIONS

Z. Chem., 15, Jg, 1, pp. 36–37 (1975).

System for mfg. high concn. oxygen gas—by pressure-fluctuating adsorption including adsorbing columns for nitrogen, J6 21 48 304–A, Chemical Engineering, p. 2, (Jul. 2, 1987).

PSA is Continuing to Move Along Steadily, p. 13.

R.M. Thorogood, Developments in air separation*, Gas Separation & Purfication, vol. 5, pp. 83–94, (1991).

Patent Abstracts of Japan, vol. 11, No. 379 (C–463), Dec. 10, 1987 & JP 62 148304 A (Nippon Sanso), Jul. 2, 1987.

*Primary Examiner*—Robert Spitzer
*Attorney, Agent, or Firm*—Sprung Kramer Schaefer & Briscoe

[57] ABSTRACT

In the pressure swing adsorption of nitrogen from gas mixtures with less polar gas components at temperatures of between 20° and 50° C., wherein the gas mixture is passed through an adsorber which is filled with packings of zeolite pellets and has an inlet zone and an outlet zone, the improvement which comprises providing at least two packings in the adsorber, a packing of Li-zeolite X in the inlet zone of the adsorber and a packing of at least one of Ca-zeolite A and Ca-zeolite X in the outlet zone of the adsorber.

12 Claims, 4 Drawing Sheets

PROCESS FOR THE ADSORPTION OF NITROGEN FROM GAS MIXTURES BY MEANS OF PRESSURE SWING ADSORPTION WITH ZEOLITES

BACKGROUND OF THE INVENTION

1. Field of the Invention

The present invention relates to an improved pressure swing adsorption process for the adsorption of nitrogen from gas mixtures with zeolite pellets.

2. Description of Prior Art

The production of oxygen from air at ambient temperatures is already performed on a large scale industrially with molecular sieve zeolites (c.f., for example, Gas Review Nippon, page 13, no. 5, 1985). Such methods exploit the preferential adsorption of nitrogen in comparison with oxygen, i.e. when the air is passed through a zeolite packing oxygen and argon are collected as the product on leaving the packing. The adsorbed nitrogen may be desorbed, for example, by evacuating the packing. In this case, the process is known as vacuum swing adsorption (VSA), in contrast with the pressure swing adsorption (PSA) process, which is also known. A continuous VSA process is characterised by the following processing stages:

a) passage of air through zeolite packing (at, for example, ambient pressure of e.g. about 1 bar) and discharge of $O_2$-rich gas from the outlet side;

b) evacuation of the packing with a vacuum pump (for example to a vacuum of approximately 100 to 300 mbar countercurrently relative to air flow);

c) filling the packing with $O_2$-rich gas (for example to ambient pressure of e.g. about 1 bar countercurrently relative to air flow (see, for example, FIG. 1 hereinbelow)).

In the PSA process, stage b) is performed at approximately ambient pressure of e.g. about 1 bar with purging with a portion of the $O_2$-rich gas. In the so-called PVSA process (a combination of VSA and PSA), separation is performed at 1.1 to 2 bar and desorption at approximately 200 to 700 mbar (minimum pressure). The object of these processes is to achieve an elevated production rate (relative to the quantity of zeolite used) and to achieve an elevated $O_2$ yield (ratio of the quantity of $O_2$ in the product to the quantity of $O_2$ in the introduced air). An elevated $O_2$ yield results in low energy demand by the vacuum pump or air compressor.

As a consequence of the three above-stated stages, there are generally three zeolite packings, i.e. three adsorbers, which are operated cyclically. In the case of the VSA process, adsorption may also be performed with 2 adsorbers (GB-A 1 559 325).

The economic viability of such adsorption plants is influenced by capital costs, such as for example quantity of adsorbent, size of vacuum pump, and in particular by operating costs, such as the electricity consumption of the vacuum pumps. Zeolites have thus been developed with which it is possible to achieve elevated levels of nitrogen adsorption, such that the quantity of zeolite used may be kept low or even reduced. Ca zeolites A, as described in EP-A-128 545, are used for this purpose.

Further developments in this area are directed towards increasing selectivity for nitrogen over oxygen.

Elevated selectivity is achieved by using lithium zeolite X (EP-A 297 542). In comparison with Na zeolite X, a higher separation factor and higher $N_2$ loading are achieved.

Better energy consumption is also achieved with Li zeolite X in comparison with Na zeolite X (EP-A 461 478, Example 2).

In order further to optimize adsorption processes for air separation, it has been proposed to use adsorbent packings which consist of zones having different types of zeolites.

JP 87/148 304 discloses an oxygen enrichment process in which an absorber with particular arrangements of various types of zeolites is used instead of an absorber with a single zeolite packing. At the air inlet side, the adsorber contains zeolites of the Na—X, Na—Y or Ca—X type and, on the air outlet side, of the Ca—A type.

In EP-A-374 631, a Ca zeolite A with low $N_2$ adsorption is used in the air inlet zone, and a Ca zeolite A with elevated $N_2$ adsorption is used in the outlet zone, wherein the $CaO/Al_2O_3$ ratio of both zeolites is approximately equal. The different $N_2$ loading capacities are a result of different levels of activation.

EP-A 0 546 542 describes a packing arrangement in which Li zeolite X is used in the air inlet zone and Na zeolite X in the air outlet zone.

Object

The object of the invention is to provide a more energy efficient pressure swing adsorption process for the adsorption of nitrogen from gas mixtures with less polar gas components, with which process it is also possible to achieve improved $O_2$ yields in comparison with the prior art.

SUMMARY OF THE INVENTION

It surprisingly proved possible to achieve this object with combinations of specific types of zeolites in the pressure swing adsorption process.

The present invention provides a process for the adsorption of nitrogen from gas mixtures with less polar gas components, in particular from air, at temperatures of between 20° and 50° C. by means of pressure swing adsorption, in which process the gas mixture is passed through an adsorber which is filled with packings of zeolite pellets and has an inlet zone and an outlet zone, the improvement which comprises providing at least two packings in the adsorber, a packing of Li zeolite X in the inlet zone of the adsorber and a packing of at least one of zeolite A, which has been exchanged with cations of the alkaline earth metal group consisting of magnesium, calcium and strontium, and of zeolite X, which has been exchanged with cations of the alkaline earth metal group consisting of magnesium, calcium and strontium, in the outlet zone of the adsorber.

DETAILED DESCRIPTION OF THE INVENTION

In pressure swing adsorption processes, a distinction is in particular drawn between VSA processes (this process variant is preferably operated at evacuation pressures of between 100 and 400 mbar and adsorption pressures of between 1 bar and 1.1 bar), PSA processes (in this case, the process is preferably operated at a desorption pressure of 1 to 1.1 bar and an adsorption pressure of 2 to 6 bar) and PVSA (in this case, the process is operated at an evacuation pressure of between 200 and 700 mbar and an adsorption pressure of between 1.1 and 2 bar).

According to the present invention, by using the combination of specific types of zeolites it proves possible not only to increase $O_2$ yield but also, surprisingly, to reduce energy consumption.

The zeolite X, which has been exchanged with cations, preferably has a molar $SiO_2/Al_2O_3$ ratio of about 2.0 to 3.0 and a molar alkaline earth metal oxide/$Al_2O_3$ ratio of about 0.45 to 1.0.

At least two packings, a packing of Li zeolite X in the inlet zone of the adsorber and a packing of at least one of Ca zeolite A and Ca zeolite X in the outlet zone of the adsorber are preferred.

In the Ca zeolite A and Ca zeolite X pellet packings in the outlet zone of the adsorber, the two types of zeolite may be present either as two separate packings or as a single packing consisting of a mixture of the two types of zeolites.

Preferably, two packings are present in the adsorber.

The Li zeolite X used is preferably a zeolite having a molar $SiO_2/Al_2O_3$ ratio of about 2.0 to 2.5 and of which about 80 to about 100% of the $AlO_2$ tetrahedron units are associated with lithium cations. The remaining cations are preferably sodium, magnesium, calcium or strontium ions or protons or mixtures thereof.

The Ca zeolite X used preferably has a molar $SiO_2/Al_2O_3$ ratio of about 2.0 to 3.0 and a molar $CaO/Al_2O_3$ ratio of about 0.45 to 1.0.

The Ca zeolite A used preferably has a degree of Ca ion exchange of about 0.45 to 1.0.

Other preferred combinations of packings are:
a packing of Li zeolite X and a packing of at least one of Sr zeolite A and Sr zeolite X,
a packing of Li zeolite X and a packing of at least one of Mg zeolite A and Mg zeolite X,
a packing of Li zeolite X and a packing of at least one of Ca zeolite A and Ca zeolite X,
a packing of Li zeolite X and a packing of at least one of a zeolite A, which has been exchanged with calcium and magnesium ions and has a molar $CaO/Al_2O_3$ ratio of 0.05 to 0.95 and a molar $MgO/Al_2O_3$ ratio of 0.05 to 0.95, and of a zeolite X, which has been exchanged with calcium and magnesium ions and has a molar $CaO/Al_2O_3$ ratio of 0.05 to 0.95 and a molar $MgO/Al_2O_3$ ratio of 0.05 to 0.95,
a packing of Li zeolite X and a packing of at least one of zeolite A, which has been exchanged with calcium and strontium ions and has a molar $CaO/Al_2O_3$ ratio of 0.05 to 0.95 and a molar $SrO/Al_2O_3$ ratio of 0.05 to 0.95, and of a zeolite X, which has been exchanged with calcium and strontium ions and has a molar $CaO/Al_2O_3$ ratio of 0.05 to 0.95 and a molar $SrO/Al_2O_3$ ratio of 0.05 to 0.95,
a packing of Li zeolite X and a packing of at least one of a zeolite A, which has been exchanged with strontium and magnesium ions and has a molar $SrO/Al_2O_3$ ratio of 0.05 to 0.95 and a molar $MgO/Al_2O_3$ ratio of 0.05 to 0.95, and of a zeolite X, which has been exchanged with strontium and magnesium ions and has a molar $SrO/Al_2O_3$ ratio of 0.05 to 0.95 and a molar $MgO/Al_2O_3$ ratio of 0.05 to 0.95.

The zeolite X which is present in the outlet zone preferably has a molar $SiO_2/Al_2O_3$ ratio of 2.0 to 3.0 and a molar $MeO/Al_2O_3$ ratio (with Me=Ca, Sr) of 0.45 to 1.0 and a molar $MeO/Al_2O_3$ ratio (with Me=Mg) of 0.3 to 1.0.

The zeolite A which is present in the outlet zone of the adsorber preferably has a molar $MeO/Al_2O_3$ ratio (with Me=Ca, Sr) of 0.45 to 1.0 and a molar $MeO/Al_2O_3$ ratio (with Me=Mg) of 0.30 to 1.0.

The proportion of Li zeolite X in the total quantity of the packings in the adsorber is about 20 to 90%, preferably about 25 to 75%. The proportion is dependent upon the air inlet temperature and the pressure ratio between the maximum adsorption pressure and the minimum desorption pressure.

For example, at an adsorption pressure of about 1 to 2 bar, the minimum evacuation pressure should preferably be between about 100 and 700 mbar, the adsorption cycle per adsorber should be about 20 to 80 seconds and the number of adsorbers should be between 1 and 3.

Industrial performance of the process according to the invention is exhaustively described, for example, in Gas Separation and Purification 1991, volume 5, June, pages 89 and 90.

In addition to the above-stated Ca-exchanged zeolites A and X, it is also possible to use zeolites A and X which have been exchanged with other divalent cations, in particular magnesium, barium, strontium or mixtures thereof. The calcium in the zeolites A and X may be partially or completely replaced by the stated divalent cations (see U.S. Pat. No. 3,313,091).

The gas stream may preferably be dried before being passed through the zeolite packing, for example by being passed through a drying layer of silica gel.

BRIEF DESCRIPTION OF THE DRAWINGS

The invention will be further described with reference to the drawings, wherein.

DETAILED DESCRIPTION OF THE DRAWING

Figure 2:
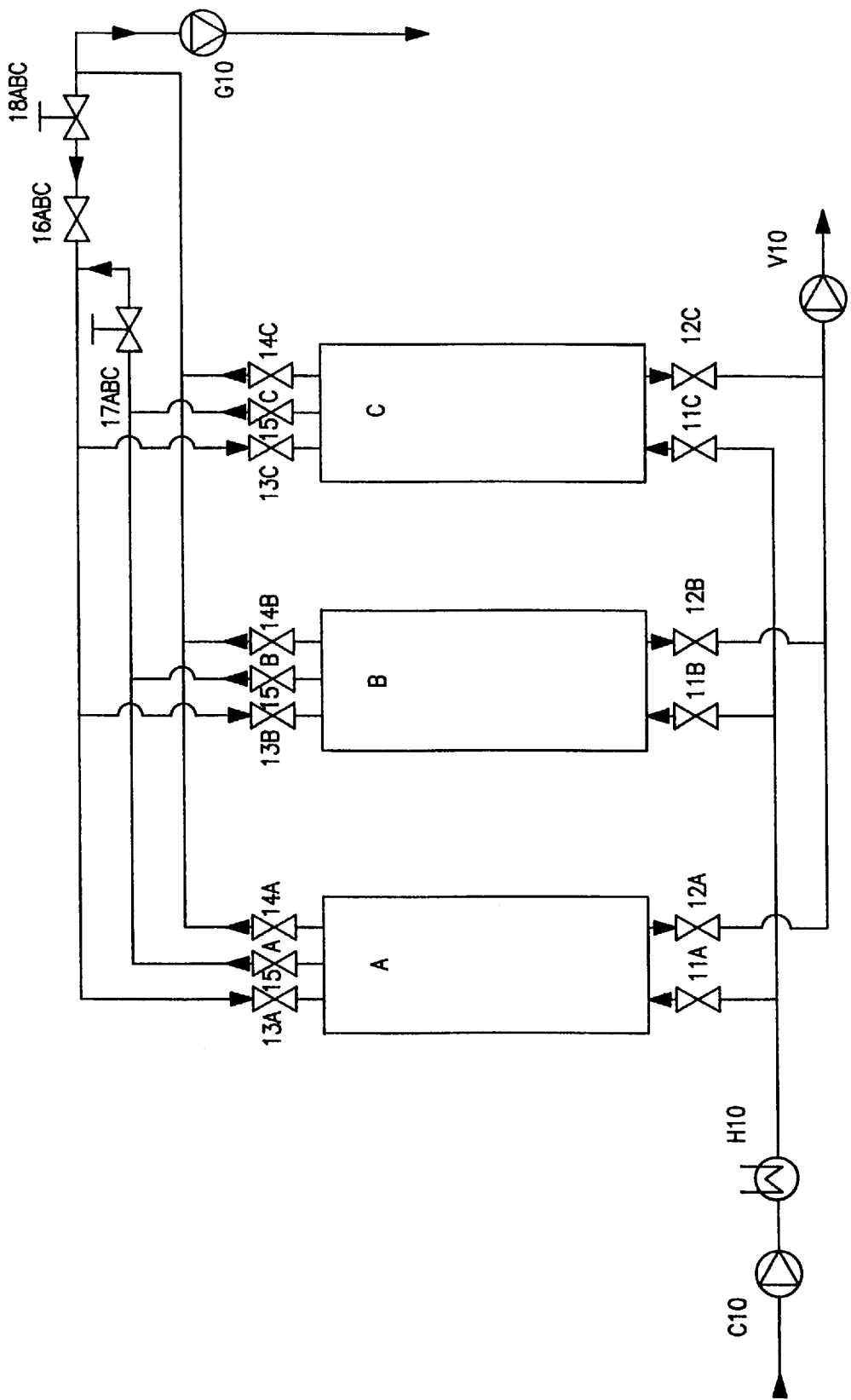
FIG. 2 is a flow sheet of an apparatus for carrying out the process of the present invention.

Referring now more particularly to FIG. 2, there are shown three adsorbers A, B and C, supplied with starting gas mixtures through valved air blower C10, the gas passing through cooler/heater H10 and then into the adsorbers A, B and C. Each adsorber has a zeolite pellet packing of a composition described in the various examples hereinbelow.

Valves 11A, 11B and 11C control the ingress of gas into the respective adsorbers, and valves 12A, 12B and 12C control egress of gas therefrom, controlled by vacuum pump V10.

Valve sets 13A, 14A, 15A and 13A, 14B, 15B and 13A, 14C, 15C control the flow of gases between their respective adsorbers, other adsorbers and/or product blower G10. Valves 16ABC and 18ABC also serve to open or close their respective lines as needed or desired.

The composition of the feed and product gases, the sequences of valve openings and closings and the composition of the zeolite pellets in the adsorbers are set forth in the illustrative examples which follow, wherein all parts are by weight unless otherwise expressed.

EXAMPLES

The zeolite X types used were produced by ion exchange of the corresponding Na zeolite X pellets (sample A).

Sample A (Na zeolite X)

Na zeolite X pellets were produced according to German patent 2 016 838, Example 2, wherein the pellets contained approximately 18% zeolite A and 82% zeolite X. The molar $SiO_2/Al_2O_3$ ratio was 2.3, the grain size 1 to 2 mm and the bulk density approximately 650 g/l. Activation was performed at 600° C. with dry nitrogen.

Sample B (Ca zeolite A)

Ca zeolite A pellets were produced in accordance with EP-A 0 170 026, Example 2. Calcination was performed in a stream of nitrogen at 500° to 600° C. The molar $CaO/Al_2O_3$ ratio was 0.72.

Sample C (Ca zeolite X)

The above-stated Na zeolite X pellets were subjected to Ca exchange prior to activation, wherein treatment was performed according to EP-A 0 170 026, Example 15. Activation was then performed under $N_2$ at 600° C. The molar $CaO/Al_2O_3$ ratio was 0.75.

Sample D (Li zeolite X)

An Na zeolite X was subjected to lithium exchange (according to EP-A 297 542) prior to activation. 12 liters of binder-free Na zeolite X pellets, produced according to DE-A 1 203 238, were placed in a column with a heatable jacket. 690 liters of 1 molar lithium chloride solution were then pumped through the pellet packing within 15 hours. The temperature was 85° C. Once ion exchange was complete, the pellets were washed with water, which had been adjusted to a pH of 9 with LiOH. Activation was then performed under nitrogen at 600° C. The molar $Li_2O/Al_2O_3$ ratio was 0.96.

Figure 1:
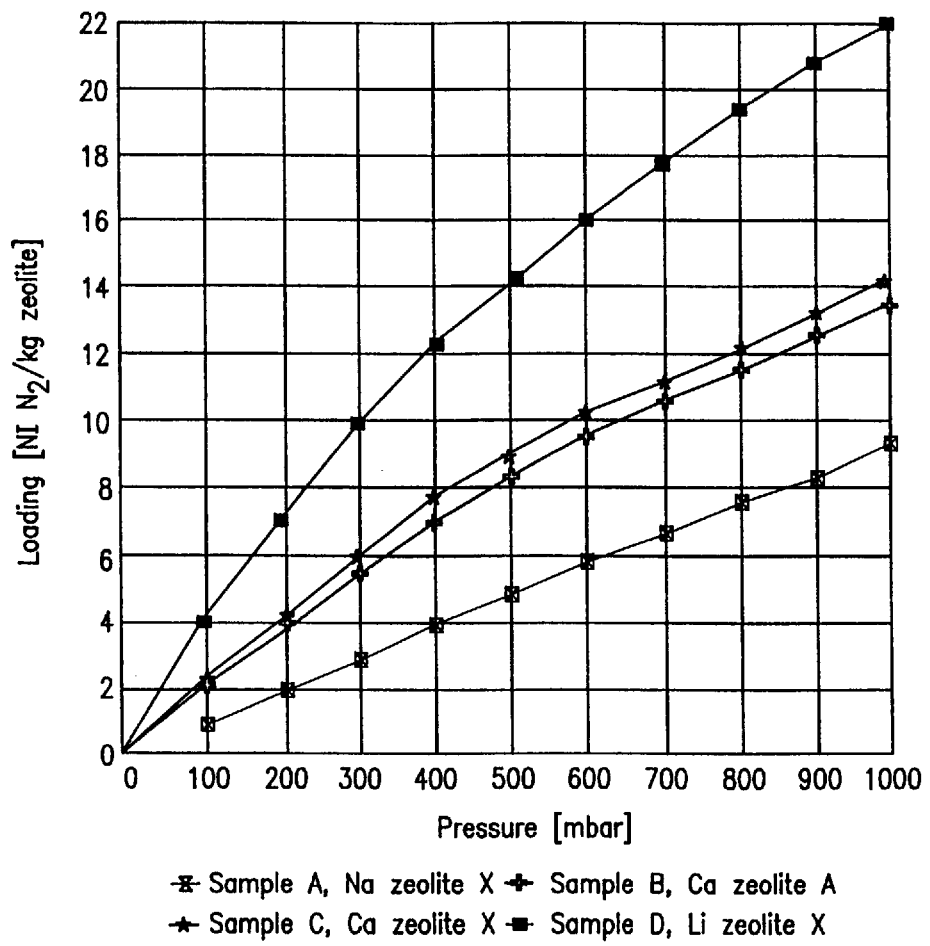
FIG. 1 is a graph of $N_2$ loading/kg of zeolite against pressure for various samples.

The nitrogen adsorption performance of the samples may be found in Table 1 and in FIG. 1.

TABLE 1

Adsorption characteristics of the samples:

| Sample | A | B | C | D |
|---|---|---|---|---|
| $N_2$ adsorption at 1 bar and 25° C. in [Nl/kg] | 9.25 | 13.5 | 14.25 | 22 |
| $N_2/O_2$ adsorption ratio at 1 bar and 25° C. | 2.65 | 2.95 | 3.15 | 4.55 |

Performance of testing

The following parameters were held constant in the test plant and during performance of the testing:

| | |
|---|---|
| Packing diameter | 500 mm |
| Packing depth of the $Al_2O_3$ layer at air inlet | 10% of MS depth |
| Air inlet temperature | 40° C. |
| Air outlet temperature | 40° C. |
| Air pressure at inlet | 1150 mbar (max.) |
| Depth of zeolite layer | 1600 mm |
| Minimum evacuation pressure, inlet | 250 mbar |
| Pressure at beginning of evacuation | 900 mbar |
| Evacuation time/adsorption time | 30 seconds |
| Transfer stage (BFP time) | 6 seconds |

The adsorbers were provided with insulation in order to prevent heat exchange with the surroundings. The wall thickness of the containers was approximately 1 mm.

Test sequence for one adsorber cycle according to FIG. 2:

| | |
|---|---|
| C 10 - | air blower |
| H 10 - | cooler/heater |
| G 10 - | product blower |
| V 10 - | vacuum pump |
| A, B, C - | adsorbers |

Time 0 sec.:

Adsorber A has completed adsorption.

Time 0–6 sec.=BFP time:

Only valve 15 A is open on adsorber A. Only valves 12 C and 13 C are open on adsorber C. $O_2$-rich gas thus flows from adsorber A via valve 15 A and via control valve 17 ABC and valve 13 C into adsorber C. Adsorber C so completes its evacuation stage, wherein the pressure rises from the minimum level (for example 250 mbar) to a higher pressure. The pressure in adsorber A falls from its maximum level (for example 1150 mbar) to the initial evacuation pressure (for example 900 mbar).

Adsorber B begins air separation, i.e. air passes through valve 11 B into adsorber B and $O_2$-rich product gas leaves valve 14 B and is passed to compressor G 10.

Time 6–30 sec.:

Only valve 12 A is open on adsorber A; adsorber A is evacuated with the vacuum pump V 10 from, for example 900 mbar, to, for example, 250 mbar. Adsorber B is at the adsorption stage as in "time 0–6 sec" and, simultaneously, $O_2$-rich gas is introduced into adsorber C via valve 13 C, valve 18 ABC and 13 C. Only valve 13 C is open on adsorber C. The introduced quantity is calculated such that, at the end of this period, the pressure in adsorber C is, for example, 1080 to 1090 mbar.

In the following cycle, adsorber C separates the air, then adsorber A, i.e. the "0–6 sec." and "6–30 sec." stages are repeated.

The following parameters were also measured during performance of the testing:

the quantity of $O_2$-rich product, the pressure profile at the adsorber inlet during the evacuation time, the evacuated quantity of gas.

The evacuated quantity of gas and the quantity of $O_2$ product are used to calculate the introduced quantity of air and thus the $O_2$ yield (=quantity of $O_2$ in product to quantity of $O_2$ in air).

All values relate to an $O_2$ concentration in the product of 93 vol. %; the energy value from the vacuum pump and air blower was also converted for an $O_2$ volume of 1000 m$^3$/h.

The energy demand for the vacuum pump was calculated from the pressure profile during evacuation of the packing by referring to the characteristic curve (=energy demand as a function of evacuation pressure) of a known Roots blower with an evacuation capacity of 20000 m$^3$/h (at 1.03 bar). The energy demand of the air blower was calculated in accordance with the following formula:

$$\frac{(3060 \times Pm - 286 \times Vo)}{10621 \times \mu}$$

| | |
|---|---|
| $Pm$ | = 1045 mbar |
| $Vo$ | = quantity of air at 1.03 bar |
| $\mu$ | = efficiency = 0.95 |

Example 1 (Comparison; Na Zeolite X)

Sample A was used in the adsorber. The residual $H_2O$ loading of the activated zeolite was below 0.5 wt. % (to DIN 8948; $P_2O_5$ method). The quantity of zeolite per adsorber was 190 kg. Oxygen enrichment was performed in accordance with the above explanations. The following data were obtained:

| | |
|---|---|
| Air temperature at inlet [°C.] | 40 |
| Quantity of product [Nm$^3$/h] | 15.9 |
| $O_2$ yield [%] | 45.5 |
| Calculated total energy demand [KWh/Nm$^3$O$_2$] | 0.46 |

Example 2 (Comparison; Ca Zeolite A)

Sample B was used in the adsorber (190 kg/adsorber). The residual $H_2O$ loading of the activated zeolite was below 0.5 wt. %. The following data were obtained:

| | |
|---|---|
| Air temperature at inlet [°C.] | 40 |
| Quantity of product [Nm³/h] | 21.4 |
| $O_2$ yield [%] | 52.5 |
| Calculated total energy demand [KWh/Nm³$O_2$] | 0.395 |

Example 3 (Comparison; Ca Zeolite X)

Sample C was used in the adsorber (190 kg/adsorber). The residual $H_2O$ loading of the activated zeolite was below 0.5 wt. %. The following data were obtained:

| | |
|---|---|
| Air temperature at inlet [°C.] | 40 |
| Quantity of product [Nm³/h] | 22 |
| $O_2$ yield [%] | 52.5 |
| Calculated total energy demand [KWh/Nm³$O_2$] | 0.40 |

Example 4 (Comparison; Li Zeolite X)

Sample D was used in the adsorber (190 kg/adsorber). The residual $H_2O$ loading of the activated zeolite was below 0.5 wt. %. The following data were obtained:

| | |
|---|---|
| Air temperature at inlet [°C.] | 40 |
| Quantity of product [Nm³/h] | 23 |
| $O_2$ yield [%] | 54 |
| Calculated total energy demand [KWh/Nm³$O_2$] | 0.375 |

Example 5 (Comparison; Li Zeolite X in Inlet Zone and Na Zeolite X in Outlet Zone)

Above the zone with the desiccant, 95 kg of sample D were introduced into the adsorber, and, thereon, 95 kg of sample A. The following data were obtained:

| | |
|---|---|
| Air temperature at inlet [°C.] | 40 |
| Quantity of product [Nm³/h] | 18 |
| $O_2$ yield [%] | 44.5 |
| Calculated total energy demand [KWh/Nm³$O_2$] | 0.46 |

Example 6 (Comparison; Ca Zeolite A in Inlet Zone and Li zeolite X in Outlet Zone)

Above the zone with the desiccant, 95 kg of sample B were introduced into the adsorber, and, thereon, 95 kg of sample D. The following data were obtained:

| | |
|---|---|
| Air temperature at inlet [°C.] | 40 |
| Quantity of product [Nm³/h] | 22 |
| $O_2$ yield [%] | 51 |
| Calculated total energy demand [KWh/Nm³$O_2$] | 0.398 |

Example 7 (According to the Invention; Li Zeolite X in Inlet Zone and Ca Zeolite X in Outlet Zone)

Above the desiccant zone, 95 kg of sample D were introduced into the adsorber and, thereon, 95 kg of sample C.

| | |
|---|---|
| Air temperature at inlet [°C.] | 40 |
| Quantity of product [Nm³/h] | 26 |
| $O_2$ yield [%] | 58 |
| Calculated total energy demand [KWh/Nm³$O_2$] | 0.350 |

Example 8 (According to the Invention; Li Zeolite X in Inlet Zone and Ca Zeolite A in Outlet Zone)

Above the desiccant zone, 95 kg of sample D were introduced into the adsorber and, thereon, 95 kg of sample B.

| | |
|---|---|
| Air temperature at inlet [°C.] | 40 |
| Quantity of product [Nm³/h] | 25.5 |
| $O_2$ yield [%] | 57.5 |
| Calculated total energy demand [KWh/Nm³$O_2$] | 0.355 |

Figure 3:
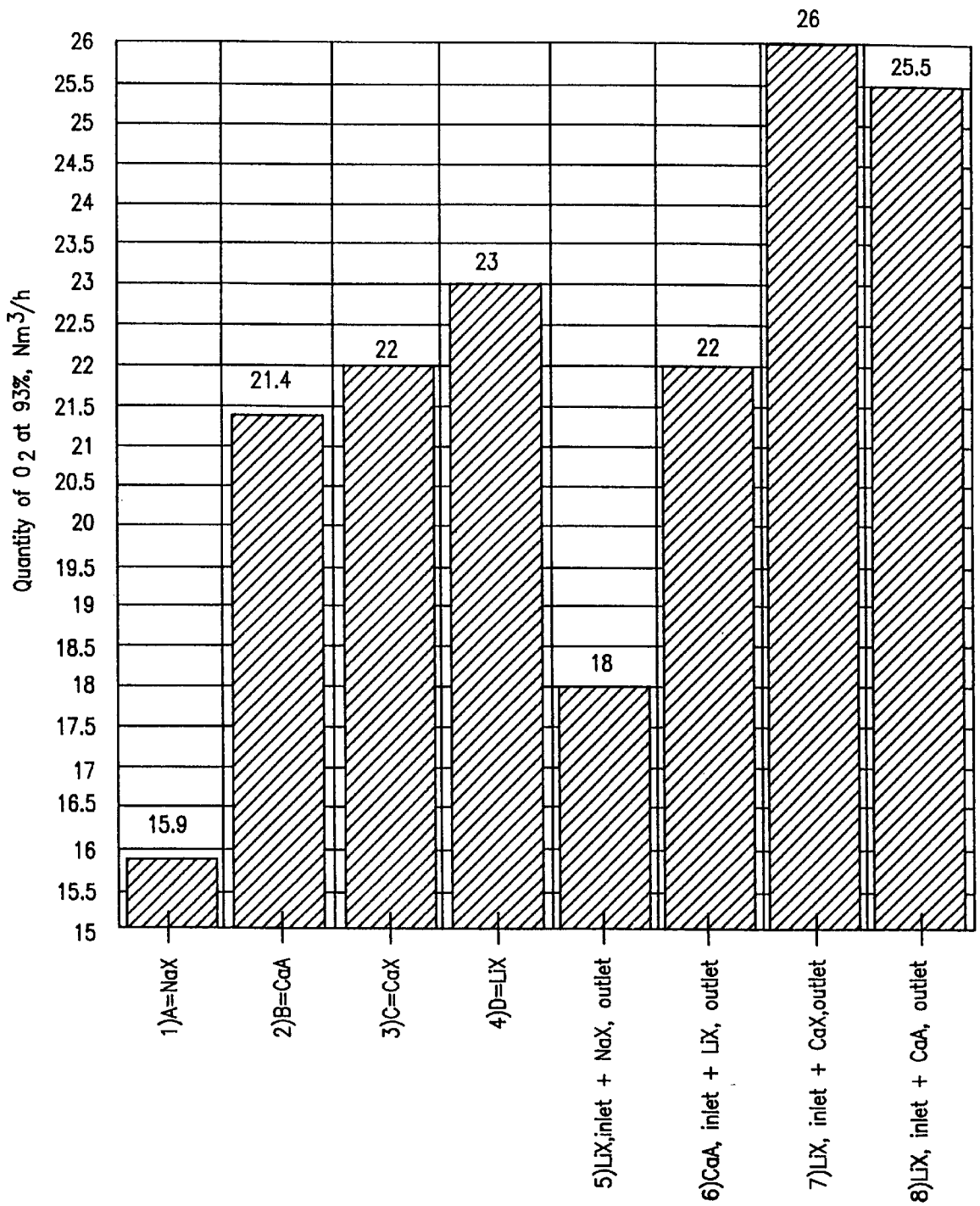
FIG. 3 is a graphic comparison of the energy demands of one trial in accordance with the prior art alongside one trial in accordance with the invention.
Figure 4:
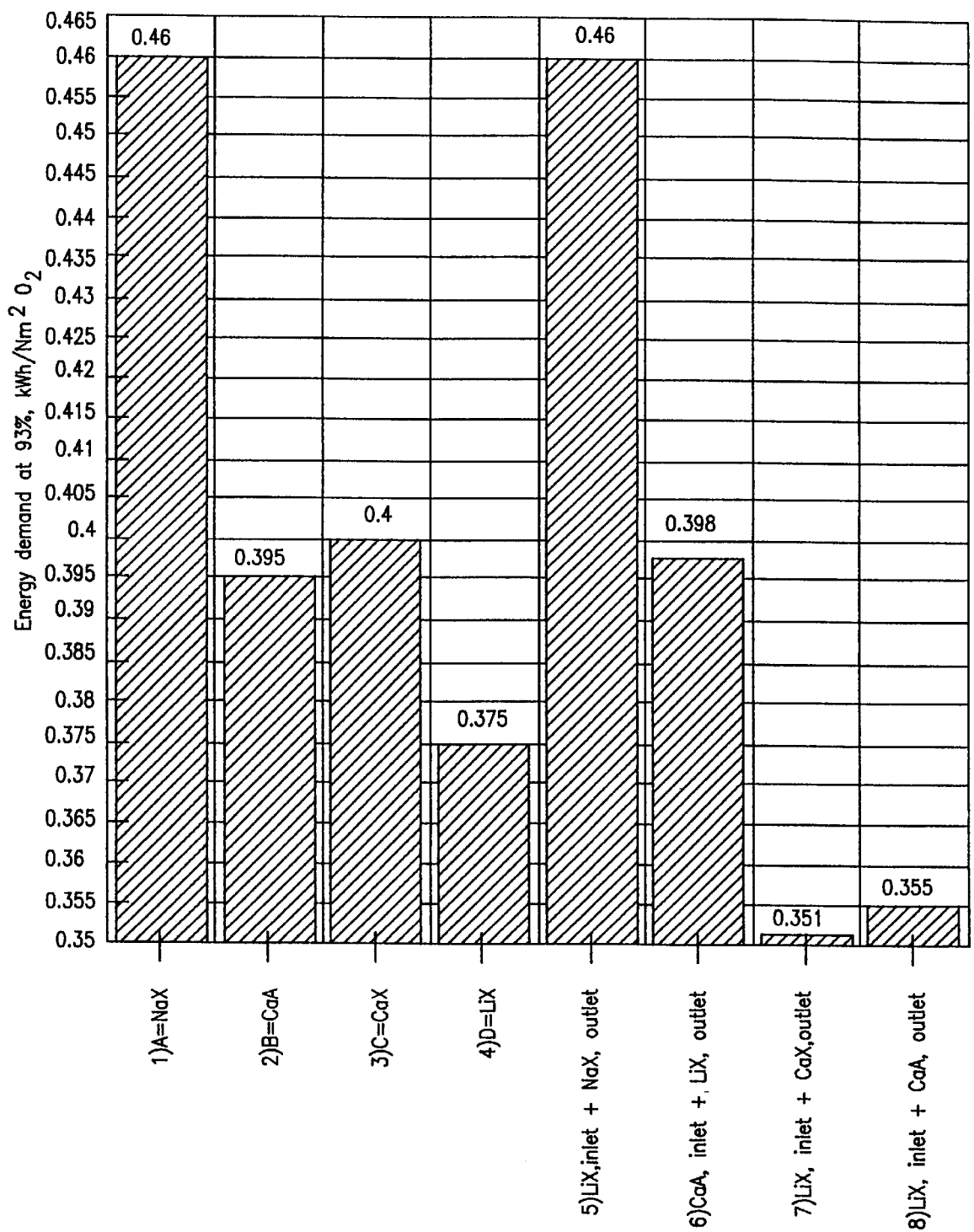
FIG. 4 is a graphic comparison similar to FIG. 3 but involving a different prior art trial and inventive trial.

The adsorber packing according to Example 7 exhibits a better $O_2$ yield and lower energy demand than the Li zeolite X packing (Example 4; see FIG. 3 and FIG. 4). $O_2$ production costs are thus lower than in Example 4. The quantity of Ca zeolite X and the Ca content in Ca zeolite X are correlated to the inlet temperature. The Ca content should be increased at higher temperatures of the incoming air, and reduced at lower temperatures.

The packing according to Example 8 produces the best results. The energy value and the $O_2$ production rate are the best in comparison with the packings according to Examples 2 or 4.

Example 5 achieves very poor energy values for the oxygen produced.

It will be understood that the specification and examples are illustrative but not limitative of the present invention and that other embodiments within the spirit and scope of the invention will suggest themselves to those skilled in the art.

We claim:

1. In the adsorption of nitrogen from a gas mixture with less polar gas components at temperatures between 20° and 50° C. by means of pressure swing adsorption, in which the gas mixture is passed through an adsorber which is filled with packings of zeolite pellets and has an pre-treatment zone, an inlet zone and an outlet zone, the improvement wherein the packing in the pretreatment zone consists essentially of a silica gel, $Al_2O_3$ both; the packing in the inlet zone consists essentially of Li-zeolite X and the packing in the outlet zone of the absorber consists essentially of at least one of zeolite A, which has been exchanged with cations of the alkaline earth metal group consisting of calcium and strontium, and of zeolite X, which has been exchanged with cations of the alkaline earth metal group consisting of calcium and strontium.

2. A process according to claim 1, wherein the zeolite X has a molar $SiO_2/Al_2O_3$ ratio of about 2.0 to 3.0 and a molar alkaline earth metal oxide/$Al_2O_3$ ratio of about 0.45 to 1.0.

3. A process according to claim 1, wherein the Li zeolite X has a molar $SiO_2/Al_2O_3$ ratio of about 2.0 to 2.5, about 80 to 100% of the $AlO_2$ tetrahedron units in the zeolite being associated with lithium cations.

4. A process according to claim 1, wherein the adsorber contains at least two packings, a packing of Li zeolite X in the inlet zone of the adsorber and a packing of at least one of Ca zeolite A and Ca zeolite X in the outlet zone of the adsorber.

5. A process according to claim 4, wherein a single packing of Li zeolite X is present in the inlet zone of the adsorber and a single packing of Ca zeolite A or Ca zeolite X is present in the outlet zone of the adsorber.

6. A process according to claim 5, wherein the Li zeolite X has a molar $SiO_2/Al_2O_3$ ratio of about 2.0 to 2.5, about 80 to 100% of the $AlO_2$ tetrahedron units in the zeolite being associated with lithium cations and (a) the Ca zeolite X is present in the outlet zone and has a molar $SiO_2/Al_2O_3$ ratio of about 2.0 to 3.0 and a molar $CaO/Al_2O_3$ ratio of about 0.45 to 1.0, or (b) the Ca zeolite A is present in the outlet zone and has a molar $CaO/Al_2O_3$ ratio of about 0.45 to 1.0.

7. A process according to claim 4, wherein the Ca zeolite X is present in the outlet zone and has a molar $SiO_2/Al_2O_3$ ratio of 2.0 to 3.0 and a molar $CaO/Al_2O_3$ ratio of 0.45 to 1.0.

8. A process according to claim 4, wherein the Ca zeolite A is present in the outlet zone and has a molar $CaO/Al_2O_3$ ratio of 0.45 to 1.0.

9. A process according to claim 1, wherein the adsorber contains at least two packings, a packing of Li zeolite X in the inlet zone of the adsorber and a packing of at least one of Sr zeolite A and Sr zeolite X in the outlet zone of the adsorber.

10. A process according to claim 9, wherein the Sr zeolite X is present in the outlet zone and has a molar $SiO_2/Al_2O_3$ ratio of 2.0 to 3.0 and a molar $SrO/Al_2O_3$ ratio of 0.45 to 1.0.

11. A process according to claim 9, wherein the Sr zeolite A is present in the outlet zone and has a molar $SrO_2/Al_2O_3$ ratio of 0.45 to 1.0.

12. A process according to claim 1, wherein the adsorber contains at least two packings, a packing of Li zeolite X in the inlet zone of the adsorber and a packing of at least one of a zeolite A, which has been exchanged with calcium and strontium ions and has a molar $CaO/Al_2O_3$ ratio of 0.05 to 0.95 and a molar $SrO/Al_2O_3$ ratio of 0.05 to 0.95, and of a zeolite X, which has been exchanged with calcium and strontium ions and has a molar $CaO/Al_2O_3$ ratio of 0.05 to 0.95 and a molar $SrO/Al_2O_3$ ratio of 0.05 to 0.95, in the outlet zone of the adsorber.

* * * * *